(12) United States Patent
Hu et al.

(10) Patent No.: US 9,022,636 B2
(45) Date of Patent: May 5, 2015

(54) SIDE-EDGE BACKLIGHT MODULE (75) Inventors: Chechang Hu, Shenzhen (CN); Lindong Fang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 217 days.

(21) Appl. No.: 13/699,712

(22) PCT Filed: Aug. 16, 2012

(86) PCT No.: PCT/CN2012/080197
§ 371 (c)(1),
(2), (4) Date: Nov. 23, 2012

(87) PCT Pub. No.: WO2014/019258
PCT Pub. Date: Feb. 6, 2014

(65) Prior Publication Data
US 2014/0036543 A1 Feb. 6, 2014

(30) Foreign Application Priority Data
Aug. 2, 2012 (CN) .......................... 2012 1 0273365

(51) Int. Cl.
*F21V 8/00* (2006.01)
(52) U.S. Cl.
CPC ............ *G02B 6/0083* (2013.01); *G02B 6/0085* (2013.01); *G02B 6/0088* (2013.01); *G02B 6/009* (2013.01)
(58) Field of Classification Search
None
See application file for complete search history.

(56) References Cited

U.S. PATENT DOCUMENTS

| 2006/0285362 | A1* | 12/2006 | Cho et al. ....................... 362/633 |
| 2011/0069255 | A1  | 3/2011  | Choi et al. |
| 2011/0141670 | A1* | 6/2011  | Jeong ........................ 361/679.01 |
| 2011/0292682 | A1* | 12/2011 | Yu et al. ........................ 362/609 |
| 2012/0092584 | A1  | 4/2012  | Jung et al. |

FOREIGN PATENT DOCUMENTS

| CN | 102141222 A  | 8/2011 |
| CN | 202074348 U  | 12/2011 |
| CN | 102346332 A  | 2/2012 |
| CN | 102411230 A  | 4/2012 |
| WO | 2012/026162 A1 | 3/2012 |

* cited by examiner

*Primary Examiner* — Ashok Patel
(74) *Attorney, Agent, or Firm* — Cheng-Ju Chiang (57) ABSTRACT

The present invention provides a side-edge backlight module, which includes a backplane, a light guide plate arranged inside the backplane, and a backlight source mounted to the backplane. The backlight source includes a circuit board and a plurality of LED lights mounted to the circuit board and electrically connected to the circuit board. The circuit board includes a mounting section and a bent section connected to the mounting section. The LED lights are mounted to the mounting section. The bent section is coupled to the backplane. The light guide plate is supported on the bent section. The side-edge backlight module of the present invention uses a MCPCB having a bent section to replace the conventional heat dissipation arrangement that attaches an MCPCB through thermal paste to an aluminum extrusion in order to improve the performance of heat dissipation and enhance the quality of backlight module.

14 Claims, 8 Drawing Sheets

Fig. 1

(Prior Art)

Fig. 2

(Prior Art)

SIDE-EDGE BACKLIGHT MODULE

BACKGROUND OF THE INVENTION

1. Field of the Invention

The present invention relates to the field of liquid crystal displaying, and in particular to a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED), at the back side of the liquid crystal panel to form a planar light source that directly provides lighting to the liquid crystal panel. The side-edge backlight module arranges an LED light bar of a backlight source at an edge of a backplane that is located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal panel.

Figure 1:
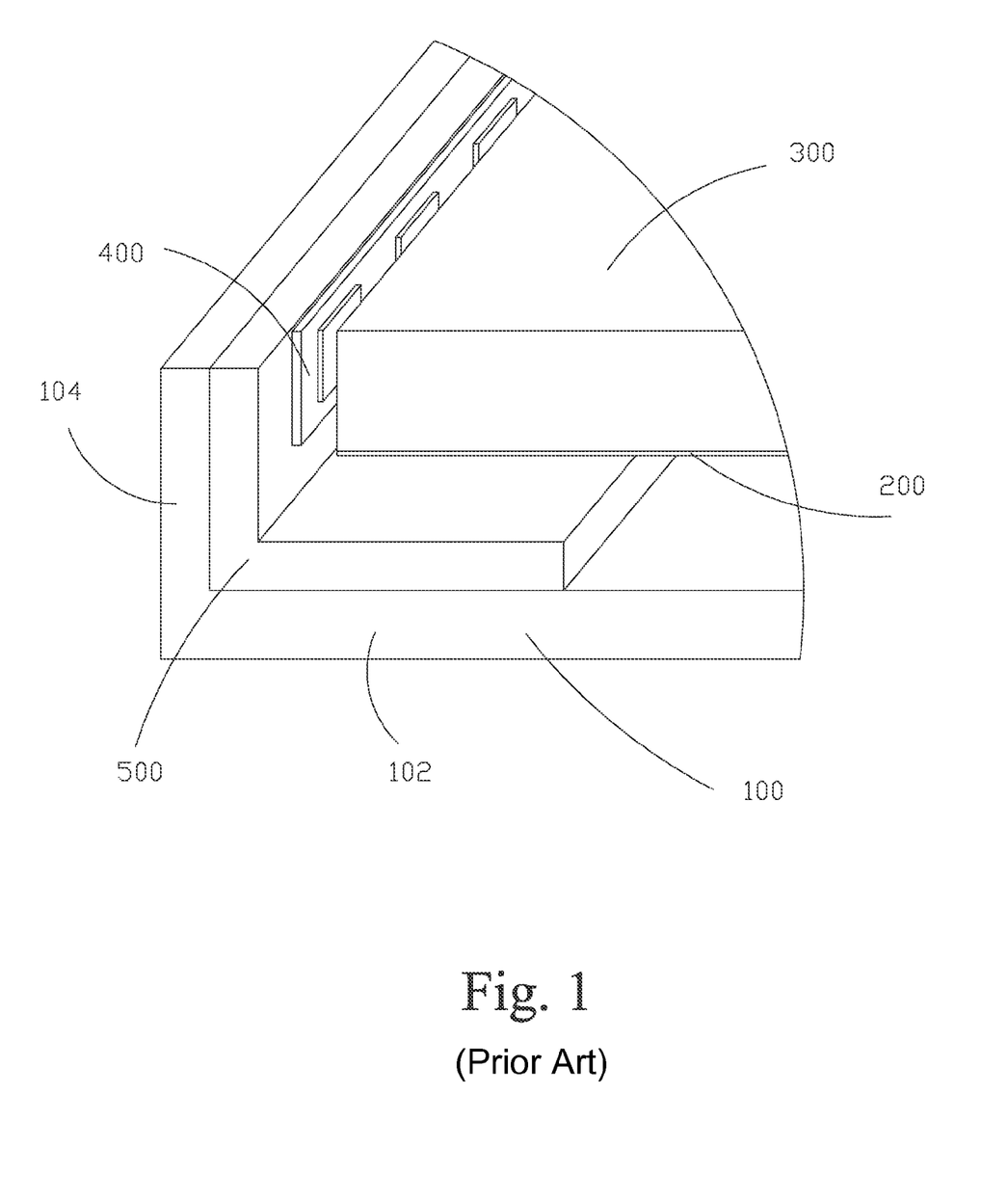
FIG. 1 is a schematic view showing a conventional side-edge backlight module.

Referring to FIG. 1, the side-edge backlight module comprises: a backplane 100, a reflector plate 200 arranged inside the backplane 100, a light guide plate 300 arranged on the reflector plate 200, a backlight source 400 arranged inside the backplane 100, and a heat dissipation board 500 arranged between the backlight source 400 and the backplane 100. The backplane 100 comprises a bottom plate 102 and a side plate 104 connected to the bottom plate 102. The backlight source 400 is mounted through thermal paste (not shown) to the heat dissipation board 500. The heat dissipation board 500 is usually an aluminum extrusion, which is fixed by screws to the bottom plate 102 of the backplane 100. Heat emitting from the backlight source 400 is conducted through the heat dissipation board 500 to the bottom plate 102 of the backplane 100 and is subjected to heat exchange with the surrounding atmosphere through the backplane 100. However, since the thermal paste is of a power thermal conductivity, the heat dissipation performance of the backlight module is poor, thereby affecting the quality of the backlight module.

Figure 2:
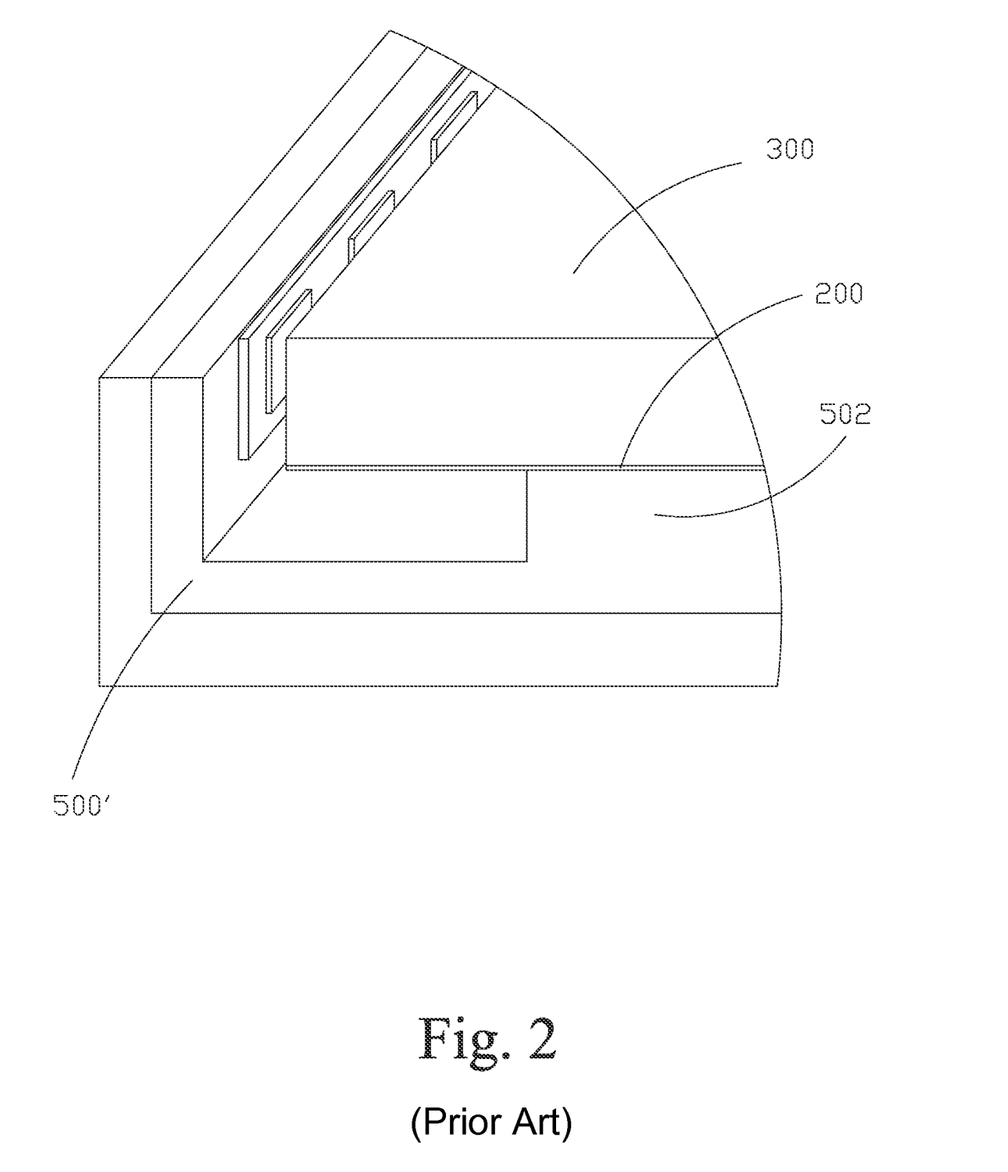
FIG. 2 is a schematic view showing another conventional side-edge backlight module.

Further, referring to FIG. 2, to support the light guide plate 300, a raised platform 502 is formed on the heat dissipation board 500'. The reflector plate 200 is supported on the raised platform 502 and the light guide plate 300 is positioned on the reflector plate 200. However, forming the raised platform 502 increases the consumption of material for the aluminum extrusion. This increases the manufacturing cost and increases the weight of the backlight module, making it adverse to weight reduction of the backlight module.

Figure 3:
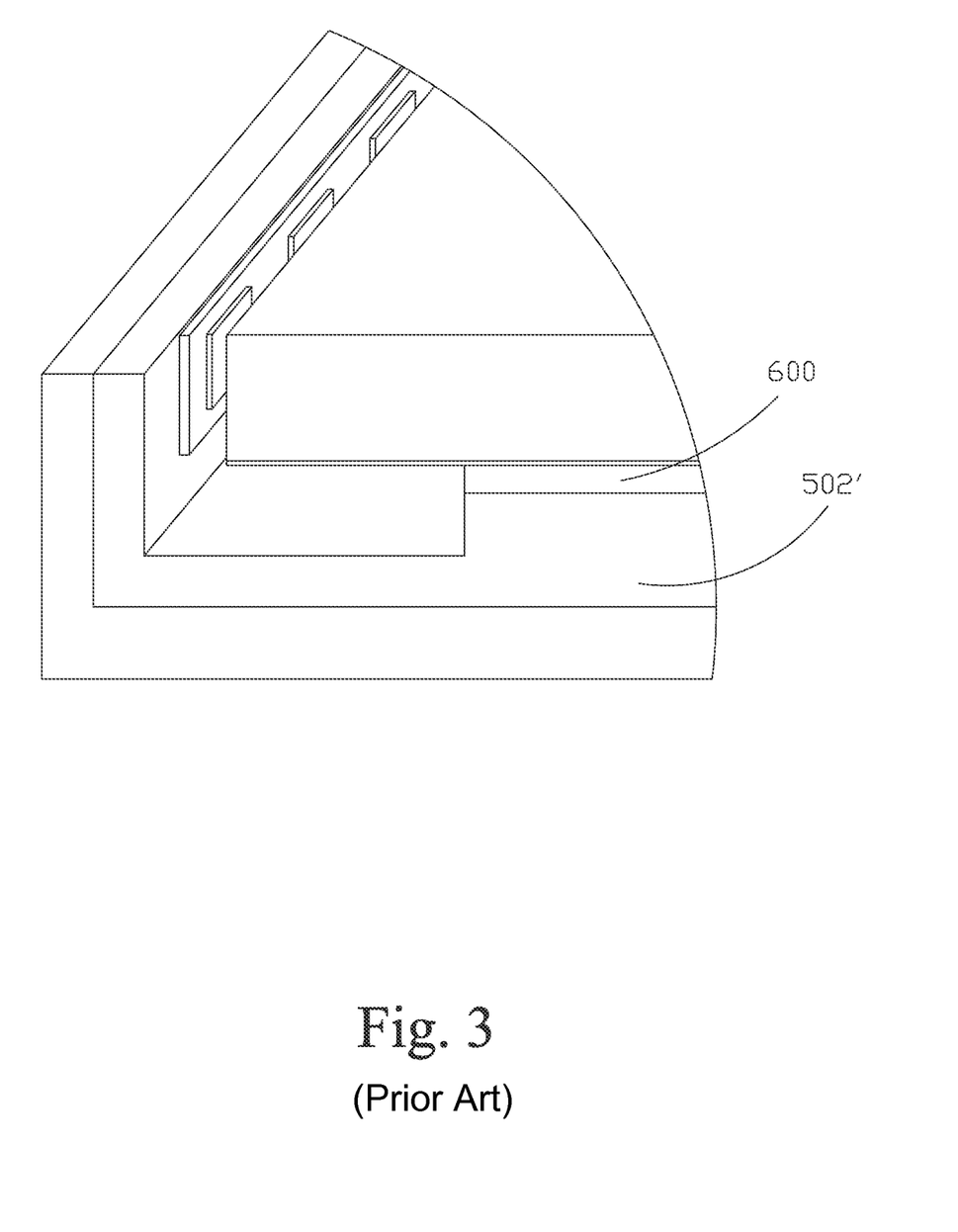
FIG. 3 is a schematic view showing a further conventional side-edge backlight module.

Referring to FIG. 3, to handle the above discussed issues, technicians of this field adopts a plastic strip 600 attached to the raised platform 502' in order to take place some of the height in order to reduce the amount of material used for the aluminum extrusion for reducing the weight of the backlight module. However, the plastic strip 600 requires preparation of plastic and fixation and this increase manufacturing process thereby increasing the manufacturing cost.

SUMMARY OF THE INVENTION

An object of the present invention is to provide a side-edge backlight module, which has a simple structure, excellent heat dissipation performance, and a low cost.

To achieve the above object, the present invention provides a side-edge backlight module, which comprises: a backplane, a light guide plate arranged inside the backplane, and a backlight source mounted to the backplane. The backlight source comprises a circuit board and a plurality of LED lights mounted to the circuit board and electrically connected to the circuit board. The circuit board comprises a mounting section and a bent section connected to the mounting section. The LED lights are arranged on the mounting section. The bent section is coupled to the backplane. The light guide plate is supported on the bent section.

The bent section is in the form of a flat plate and is connected, in a perpendicular manner, to the mounting section.

The side-edge backlight module further comprises a plastic strip arranged on the bent section. The plastic strip forms a plurality of stepped holes. The bent section forms a plurality of first through holes corresponding to the stepped holes. The backplane forms a plurality of first threaded holes corresponding to the plurality of through holes. The plastic strip, the bent section, and the backplane are secured together with screws to have the light guide plate supported on the plastic strip.

The bent section comprises a first connection section, a raised section connected to the first connection section, and a second connection section connected to the raised section. The first connection section is perpendicularly connected to the mounting section. The second connection section is coupled to the backplane.

The second connection section forms a plurality of second through holes. The backplane forms a plurality of second threaded holes corresponding to the second through holes. The second connection section and the backplane are secured together with screws to have the light guide plate supported on the raised section.

The bent section comprises a third connection section, a fourth connection section perpendicularly connected to the third connection section, and a support section perpendicularly connected to the fourth connection section. The third connection section is perpendicularly connected to the mounting section. The support section is coupled to the backplane.

The support section forms a plurality of third threaded holes. The backplane forms a plurality of third through holes corresponding to the third threaded holes. The support section and the backplane are secured together with screws to have the light guide plate supported on the support section.

The circuit board comprises a metal core printed circuit board (MCPCB).

The backplane comprises a bottom plate and a side plate connected to the bottom plate. The bent section is coupled to the bottom plate of the backplane.

The side-edge backlight module comprises a reflector plate arranged between the light guide plate and the bottom plate of the backplane and an optic film assembly arranged atop the light guide plate.

The present invention also provides a side-edge backlight module, which comprises: a backplane, a light guide plate arranged inside the backplane, and a backlight source mounted to the backplane, the backlight source comprising a circuit board and a plurality of LED lights mounted to the circuit board and electrically connected to the circuit board, the circuit board comprising a mounting section and a bent section connected to the mounting section, the LED lights being arranged on the mounting section, the bent section being coupled to the backplane, the light guide plate being supported on the bent section;

wherein the bent section is in the form of a flat plate and is connected, in a perpendicular manner, to the mounting section;

wherein a plastic strip is arranged on the bent section, the plastic strip forming a plurality of stepped holes, the bent section forming a plurality of first through holes corresponding to the stepped holes, the backplane forming a plurality of first threaded holes corresponding to the plurality of through holes, the plastic strip, the bent section, and the backplane being secured together with screws to have the light guide plate supported on the plastic strip;

wherein the circuit board comprises a metal core printed circuit board (MCPCB);

wherein the backplane comprises a bottom plate and a side plate connected to the bottom plate, the bent section being coupled to the bottom plate of the backplane; and wherein a reflector plate is arranged between the light guide plate and the bottom plate of the backplane and an optic film assembly arranged atop the light guide plate.

The efficacy of the present invention is that the present invention provides a side-edge backlight module, which uses a MCPCB having a bent section to replace the conventional heat dissipation arrangement that attaches an MCPCB through thermal paste to an aluminum extrusion in order to improve the performance of heat dissipation and enhance the quality of backlight module. Further, the bent section of the MCPCB can be of various configurations to support a light guide plate so as to omit the conventionally used aluminum extrusion and thus lowering down the manufacturing cost to a substantial extent.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 4:
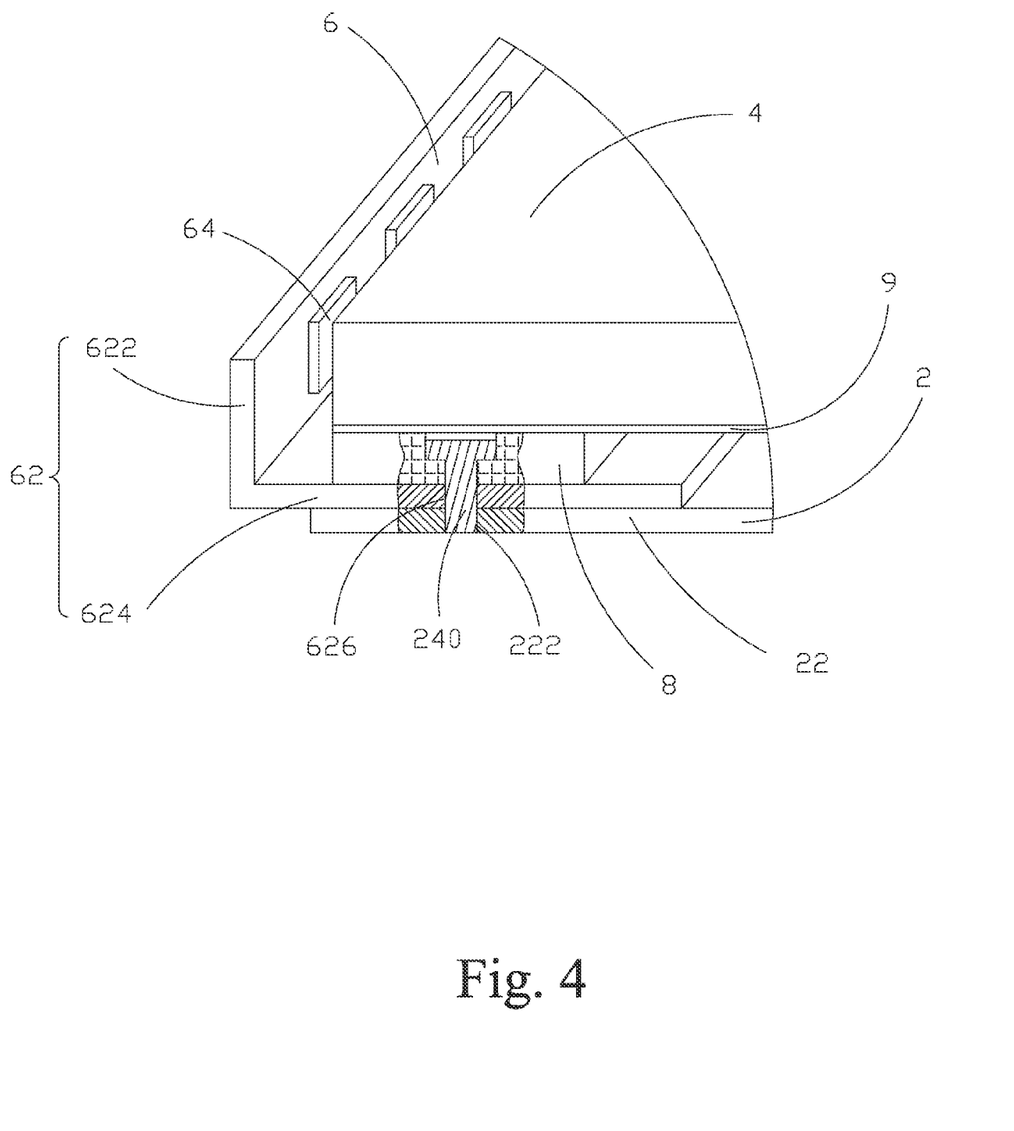
FIG. 4 is a schematic view showing a side-edge backlight module according to a first embodiment of the present invention.
Figure 5:
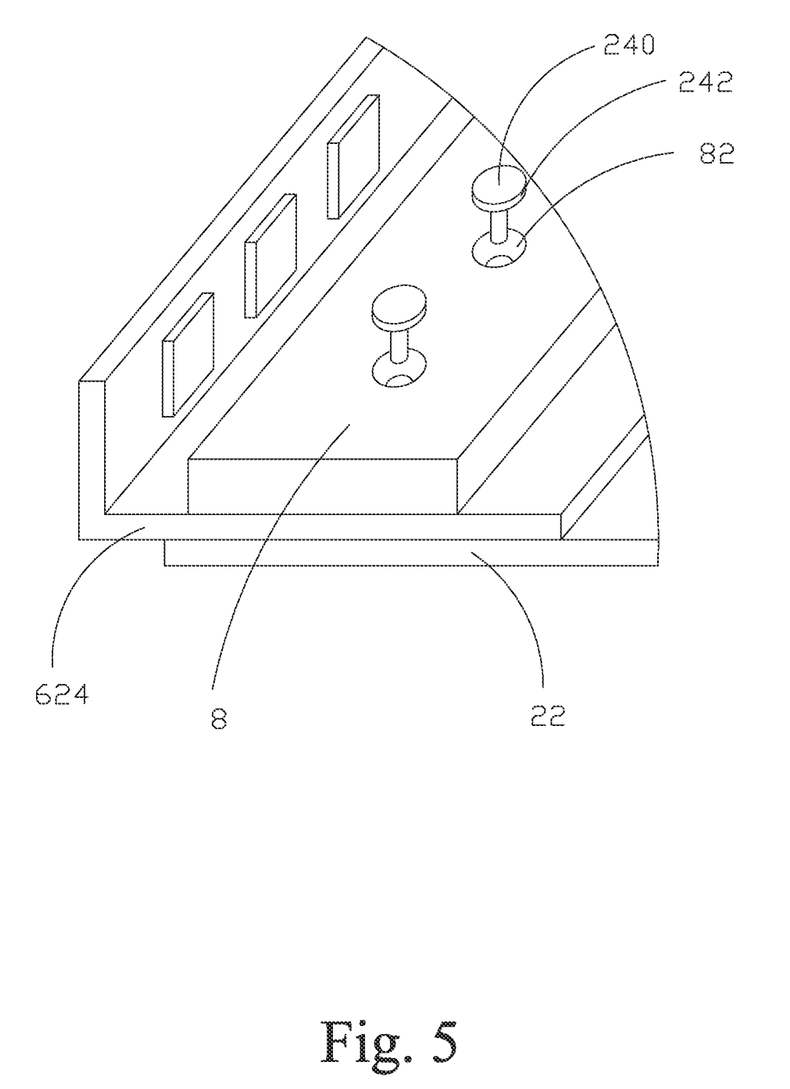
FIG. 5 is a schematic view showing a mounting structure of a backplane and a backlight source of FIG. 4.

Referring to FIGS. 4 and 5, the present invention provides a side-edge backlight module, which comprises: a backplane 2, a light guide plate 4 arranged inside the backplane 2, and a backlight source 6 mounted on the backplane 2.

The backplane 2 comprises a bottom plate 22 and a side plate (not shown) coupled to the bottom plate 22.

The backlight source 6 comprises a circuit board 62 and a plurality of LED lights 64 mounted on the circuit board 62 and electrically connected to the circuit board 62.

The circuit board 62 can be a MCPCB (Metal Core Printed Circuit Board) which comprises a mounting section 622 and a bent section 624 connected to the mounting section 622. The LED lights 64 are arranged on the mounting section 622. The bent section 624 is coupled to the bottom plate 22 of the backplane 2 so as to mount the backlight source 6 mounted to the backplane 2. The light guide plate 4 is supported on the bent section 624.

In the instant embodiment, the side-edge backlight module further comprises a plastic strip 8 arranged on the bent section 624. The bent section 624 is in the form of a flat plate and is connected, in a perpendicular manner, to the mounting section 622.

The plastic strip 8 forms a plurality of stepped holes 82. The bent section 624 forms a plurality of first through holes 626 corresponding to the stepped holes 82. The bottom plate 22 of the backplane 2 forms a plurality of first threaded holes 222 corresponding to the plurality of first through holes 626. The plastic strip 8, the bent section 624, and the bottom plate 22 of the backplane 2 are secured together with screws 240 so as mount the backlight source 6 on the backplane 2.

In the instant embodiment, the light guide plate 4 is supported on the plastic strip 8. The screws 240 have screw heads 242 that are completely received in the stepped holes 82 of the plastic strip 8 so as not to interfere with the light guide plate 4. Preferably, the screw heads 242 and the stepped holes 82 are set in interference fitting in order to prevent the screws 240 from sliding and rotating off to damage the light guide plate 4 due to long term use.

The side-edge backlight module according to the instant embodiment uses the screws 240 to fixedly connect the backlight source 6 and the plastic strip 8 to the backplane 2, avoiding the complicated conventional process that fixes the backlight source and the plastic strip separately, so as to simplify the manufacturing process. Further, since the circuit board 62 of the backlight source 6 is allowed to directly exchange heat with the surrounding environment, the effect of heat dissipation is improved. An application to a backlight module of a 32-inch liquid crystal display will be taken as an example to describe, in detail, the technical effect of the side-edge backlight module according to the present invention:

Referring to Table 1, in which "Regular MCPCB" indicates a conventional backlight module that adopts aluminum extrusion based heat dissipation and "Bent MCPCB" indicates a backlight module according to the present invention formed of a MCPCB having a bent section. Data of heat dissipation are given in the Table for comparison:

TABLE 1

Comparison of Temperature for Regular MCPCB and Bent MCPCB

| MCPCB | Temperature (° C.) | | | | Average Temperature (° C.) | Average Temperature (° C.) |
|---|---|---|---|---|---|---|
| | 2nd | 16th | 29th | 42nd | | |
| Regular MCPCB | 66.7 | 62.1 | 73.7 | 64.4 | 66.7 | 6.4 |
| Bent MCPCB | 59.2 | 61.1 | 61.7 | 59.2 | 60.3 | |

In the following Table, a comparison for cost is given:

TABLE 2

Comparison of Cost for Regular MCPCB and Bent MCPCB

| Item | Regular MCPCB ($) | Bent MCPCB ($) |
|---|---|---|
| MCPCB | 0.6 | 1 |
| Thermal Paste | 0.15 | 0 |
| Aluminum Extrusion | 0.8 | 0 |
| Total | 1.55 | 1 |
| Difference | | 0.55 |

Apparently, the side-edge backlight module of the present invention shows advantages over the conventional side-edge backlight module in respect to heat dissipation performance and cost.

The side-edge backlight module of the present invention further comprises a reflector plate 9 arranged between the light guide plate 4 and the bottom plate 22 of the backplane 2 and an optic film assembly (not shown) arranged atop the light guide plate 4. These are known techniques and description will be omitted.

Figure 6:
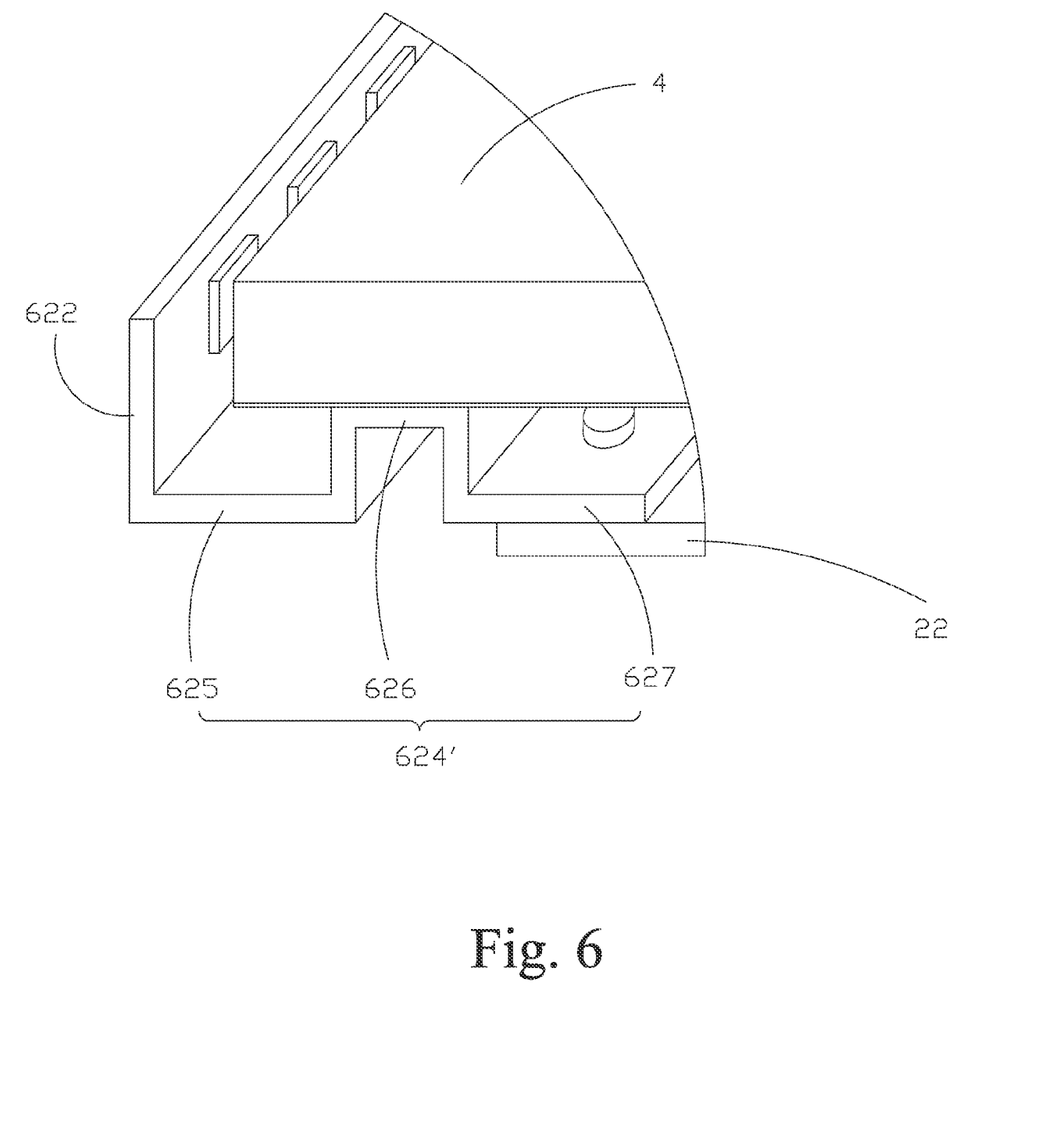
FIG. 6 is a schematic view showing a side-edge backlight module according to a second embodiment of the present invention.
Figure 7:
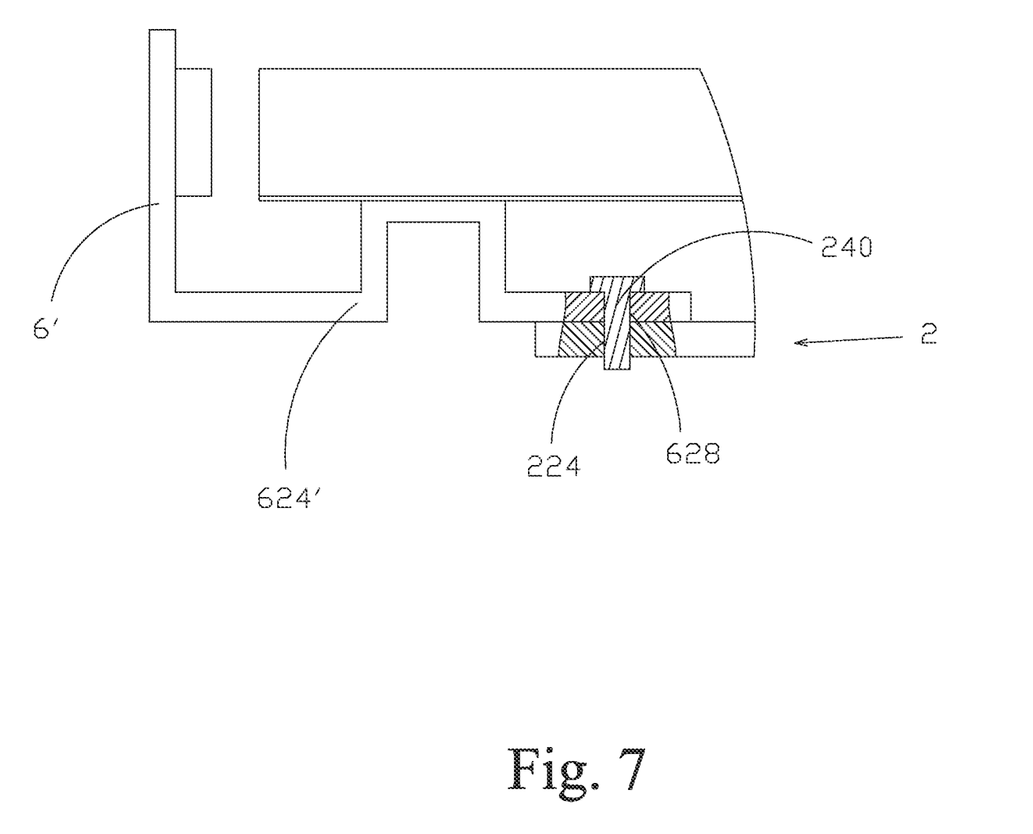
FIG. 7 is a partial cross-sectional view of FIG. 6.

Referring to FIGS. 6 and 7, which is a schematic view showing a side-edge backlight module according to a second embodiment of the present invention, in the instant embodiment, the bent section 624' comprises a first connection section 625, a raised section 626 connected to the first connection section 625, and a second connection section 627 connected to the raised section 626. The first connection section 625 is perpendicularly connected to the mounting section 622. The second connection section 627 is coupled to the bottom plate 22 of the backplane 2.

The second connection section 627 forms a plurality of second through holes 628. The bottom plate 22 of the backplane 2 forms a plurality of second threaded holes 224 corresponding to the second through holes 628. The second connection section 627 and the backplane 2 are secured together with screws 240 so as to mount the backlight source 6' to the backplane 2.

In the instant embodiment, the raised section 626 is raised from the first connection section 625 toward the light guide plate 4 and the light guide plate 4 is supported on the raised section 626. In the instant embodiment, the plastic strip is omitted to further improve heat conduction performance and lower down manufacturing cost.

Figure 8:
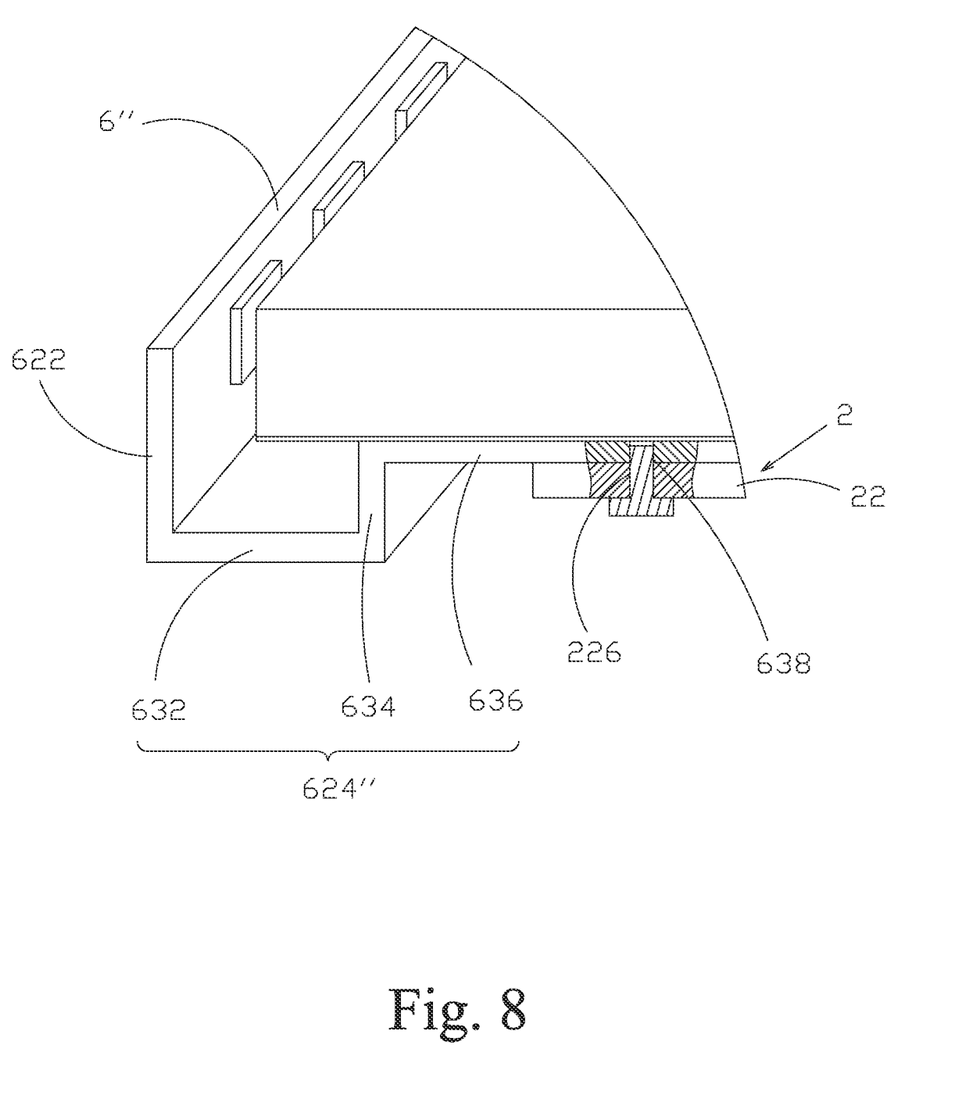
FIG. 8 is a schematic view showing a side-edge backlight module according to a third embodiment of the present invention.

Referring to FIG. 8, which shows a schematic view of a side-edge backlight module according to a third embodiment of the present invention, in the instant embodiment, the bent section 624" comprises a third connection section 632, a fourth connection section 634 perpendicularly connected to the third connection section 632, and a support section 636 perpendicularly connected to the fourth connection section 634. The third connection section 632 is perpendicularly connected to the mounting section 622. The support section 636 is coupled to the bottom plate 22 of the backplane 2.

The support section 636 forms a plurality of third threaded holes 638. The bottom plate 22 of the backplane 2 forms a plurality of third through holes 226 corresponding to the third threaded holes 638. The support section 636 and the backplane 2 are secured together with screws 240 so as to mount the backlight source 6" to the backplane 2.

In the instant embodiment, the light guide plate 4 is supported on the support section 636. The mounting section 622 and the third and the fourth connection sections 632, 634 collectively define a chamber that facilitates convection of air and thus improve the performance of heat dissipation.

In summary, the present invention provides a side-edge backlight module, which uses a MCPCB having a bent section to replace the conventional heat dissipation arrangement that attaches an MCPCB through thermal paste to an aluminum extrusion in order to improve the performance of heat dissipation and enhance the quality of backlight module. Further, the bent section of the MCPCB can be of various configurations to support a light guide plate so as to omit the conventionally used aluminum extrusion and thus lowering down the manufacturing cost to a substantial extent.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising: a backplane, a light guide plate arranged inside the backplane, and a backlight source mounted to the backplane, the backlight source comprising a circuit board and a plurality of light emitting diode (LED) lights mounted to the circuit board and electrically connected to the circuit board, the circuit board comprising a mounting section and a bent section connected to the mounting section, the LED lights being arranged on the mounting section, the bent section being coupled to the backplane, the light guide plate being supported on the bent section, wherein the bent section is in the form of a flat plate and is connected, in a perpendicular manner, to the mounting section; and further comprising a plastic strip arranged on the bent section, the plastic strip forming a plurality of stepped holes, the bent section forming a plurality of first through holes corresponding to the stepped holes, the backplane forming a plurality of first threaded holes corresponding to the plurality of through holes, the plastic strip, the bent section, and the backplane being secured together with screws to have the light guide plate supported on the plastic strip.

2. The side-edge backlight module as claimed in claim 1, wherein the circuit board comprises a metal core printed circuit board (MCPCB).

3. The side-edge backlight module as claimed in claim 1, wherein the backplane comprises a bottom plate and a side plate connected to the bottom plate, the bent section being coupled to the bottom plate of the backplane.

4. The side-edge backlight module as claimed in claim 3 further comprising a reflector plate arranged between the light guide plate and the bottom plate of the backplane and an optic film assembly arranged atop the light guide plate.

5. A side-edge backlight module, comprising: a backplane, a light guide plate arranged inside the backplane, and a backlight source mounted to the backplane, the backlight source comprising a circuit board and a plurality of light emitting diode (LED) lights mounted to the circuit board and electrically connected to the circuit board, the circuit board comprising a mounting section and a bent section connected to the mounting section, the LED lights being arranged on the mounting section, the bent section being coupled to the backplane, the light guide plate being supported on the bent section;

wherein the bent section is in the form of a flat plate and is connected, in a perpendicular manner, to the mounting section;

wherein a plastic strip is arranged on the bent section, the plastic strip forming a plurality of stepped holes, the bent section forming a plurality of first through holes corresponding to the stepped holes, the backplane forming a plurality of first threaded holes corresponding to the plurality of through holes, the plastic strip, the bent section, and the backplane being secured together with screws to have the light guide plate supported on the plastic strip;

wherein the circuit board comprises a metal core printed circuit board (MCPCB);

wherein the backplane comprises a bottom plate and a side plate connected to the bottom plate, the bent section being coupled to the bottom plate of the backplane; and wherein a reflector plate is arranged between the light guide plate and the bottom plate of the backplane and an optic film assembly arranged atop the light guide plate.

6. A side-edge backlight module, comprising: a backplane, a light guide plate arranged inside the backplane, and a backlight source mounted to the backplane, the backlight source comprising a circuit board and a plurality of light emitting diode (LED) lights mounted to the circuit board and electrically connected to the circuit board, the circuit board comprising a mounting section and a bent section connected to the mounting section, the LED lights being arranged on the mounting section, the bent section being coupled to the backplane, the light guide plate being supported on the bent section;

wherein the bent section comprises a first connection section, a raised section connected to the first connection section, and a second connection section connected to the raised section, the first connection section being perpendicularly connected to the mounting section, the second connection section being coupled to the backplane; and wherein the second connection section forms a plurality of second through holes, the backplane forming a plurality of second threaded holes corresponding to the second through holes, the second connection section and the backplane being secured together with screws to have the light guide plate supported on the raised section.

7. The side-edge backlight module as claimed in claim 6, wherein the circuit board comprises a metal core printed circuit board (MCPCB).

8. The side-edge backlight module as claimed in claim 6, wherein the backplane comprises a bottom plate and a side plate connected to the bottom plate, the bent section being coupled to the bottom plate of the backplane.

9. The side-edge backlight module as claimed in claim 8 further comprising a reflector plate arranged between the light guide plate and the bottom plate of the backplane and an optic film assembly arranged atop the light guide plate.

10. A side-edge backlight module, comprising: a backplane, a light guide plate arranged inside the backplane, and a backlight source mounted to the backplane, the backlight source comprising a circuit board and a plurality of light emitting diode (LED) lights mounted to the circuit board and electrically connected to the circuit board, the circuit board comprising a mounting section and a bent section connected to the mounting section, the LED lights being arranged on the mounting section, the bent section being coupled to the backplane, the light guide plate being supported on the bent section;

wherein the bent section comprises a third connection section, a fourth connection section perpendicularly connected to the third connection section, and a support section perpendicularly connected to the fourth connection section, the third connection section being perpendicularly connected to the mounting section, the support section being coupled to the backplane.

11. The side-edge backlight module as claimed in claim 10, wherein the support section forms a plurality of third threaded holes, the backplane forming a plurality of third through holes corresponding to the third threaded holes, the support section and the backplane being secured together with screws to have the light guide plate supported on the support section.

12. The side-edge backlight module as claimed in claim 10, wherein the circuit board comprises a metal core printed circuit board (MCPCB).

13. The side-edge backlight module as claimed in claim 10, wherein the backplane comprises a bottom plate and a side plate connected to the bottom plate, the bent section being coupled to the bottom plate of the backplane.

14. The side-edge backlight module as claimed in claim 13 further comprising a reflector plate arranged between the light guide plate and the bottom plate of the backplane and an optic film assembly arranged atop the light guide plate.

* * * * *